United States Patent Office 3,666,360
Patented May 30, 1972

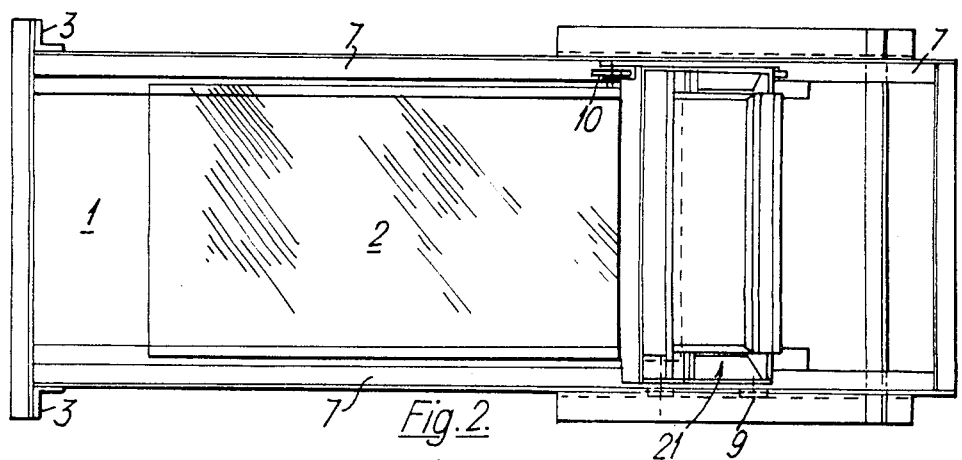
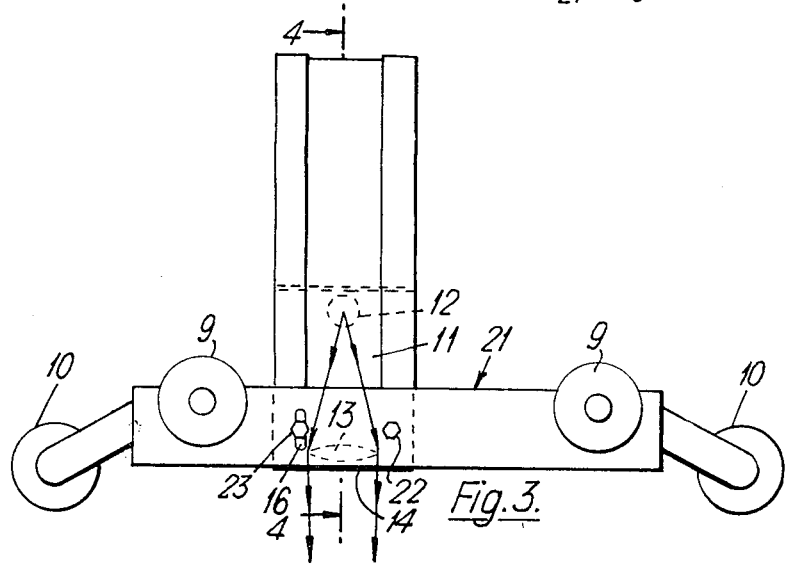
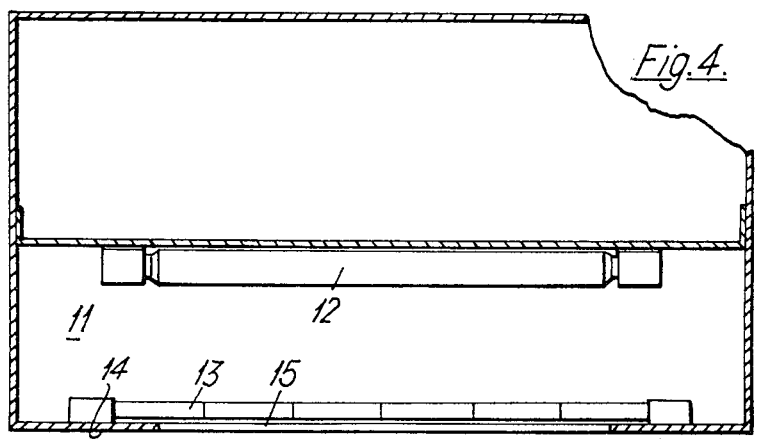

3,666,360
METHOD AND APPARATUS FOR INSPECTING A GLASS SURFACE
Harry Mills and Leslie Woods, Lancashire, England, assignors to Pilkington Brothers Limited, Liverpool, England
Filed Feb. 5, 1971, Ser. No. 112,961
Claims priority, application Great Britain, Feb. 2, 1970, 6,149/70
Int. Cl. G01n 21/00, 21/48, 21/16
U.S. Cl. 356—72                                10 Claims

ABSTRACT OF THE DISCLOSURE

A glass surface is inspected for defects, especially sleeks, by directing a beam of light to illuminate an area of the glass surface and to produce by reflection a beam of light passing through a stationary position above the glass surface, and traversing the incident beam about an axis disposed at the position below the glass surface of the imaginary mirror image of the said stationary position above the glass and extending parallel to the glass surface and perpendicular to the incident beam, whereby the illuminated area moves over the glass surface whilst the main reflected beam continues to pass through said stationary position. Said illuminated area is then observed from a position adjacent said stationary position, either visually or by a photomultiplier.

BACKGROUND OF THE INVENTION

The present invention relates to a method and apparatus for inspecting a glass surface for defects, especially sleeks.

The term "sleek" is herein applied to a surface defect in the form of a fine line usually a few inches in length and of the order of one or two thousandths of an inch in width. Although scratch-like in proportions, it is generally finer and smoother than a scratch and tends to reflect light rather than to scatter it.

SUMMARY

The present invention provides a method of inspecting a glass surface comprising directing a beam of light to illuminate an area of the glass surface and to produce by reflection a beam of light passing through a stationary position above the glass surface, traversing the incident beam about an axis disposed at the position below the glass surface of the imaginary mirror image of the said stationary position above the glass and extending parallel to the glass surface and perpendicular to the incident beam, whereby the illuminated area moves over the glass surface whilst the main reflected beam continues to pass through said stationary position, and observing said illuminated area from a position adjacent to said stationary position.

Preferably the angle of observation of the illuminated area is up to about 10° from the angle of inclination of the main reflected beam with respect to the glass surface.

The present invention also provides apparatus for inspecting a glass surface comprising a light source mounted above the glass surface for directing a beam of light to illuminate an area of the glass surface and to produce by reflection a beam of light passing through a stationary position above the glass surface, and means for traversing the incident beam about an axis disposed at the position below the glass surface of the imaginary mirror image of the said stationary position above the glass and extending parallel to the glass surface and perpendicular to the incident beam whereby the illuminated area moves over the glass surface whilst the main reflected beam continues to pass through said stationary position, so permitting the illuminated area to be observed from a position adjacent to said stationary position.

The apparatus of the present invention may include observation means comprising an opaque screen disposed at said stationary position and having an aperture, for example a slit, to allow light adjacent to the main reflected beam to pass therethrough but not from the main beam, the light reflected in the direction of the aperture from any defect on the glass surface within the illuminated area being of greater intensity than light reflected or scattered in the same direction from adjacent areas of the glass surface. The aperture is preferably disposed up to about 10° from the angle of inclination of the main reflected beam with respect to the glass surface. A photomultiplier may be disposed to receive the light passing through said aperture.

The method and apparatus of the invention are especially applicable to the detection of sleeks in the surface of glass, although the invention is not limited to this use.

BRIEF DESCRIPTION OF THE DRAWINGS

FIG. 2 is a plan view of the inspection apparatus shown in FIG. 1;

FIG. 3 is an enlarged side elevation of the carriage unit forming a part of the inspection apparatus shown in FIG. 1;

FIG. 4 is a section of the optical apparatus taken along the line 4—4 in FIG. 3;

DESCRIPTION OF THE PREFERRED EMBODIMENTS

Figure 1:
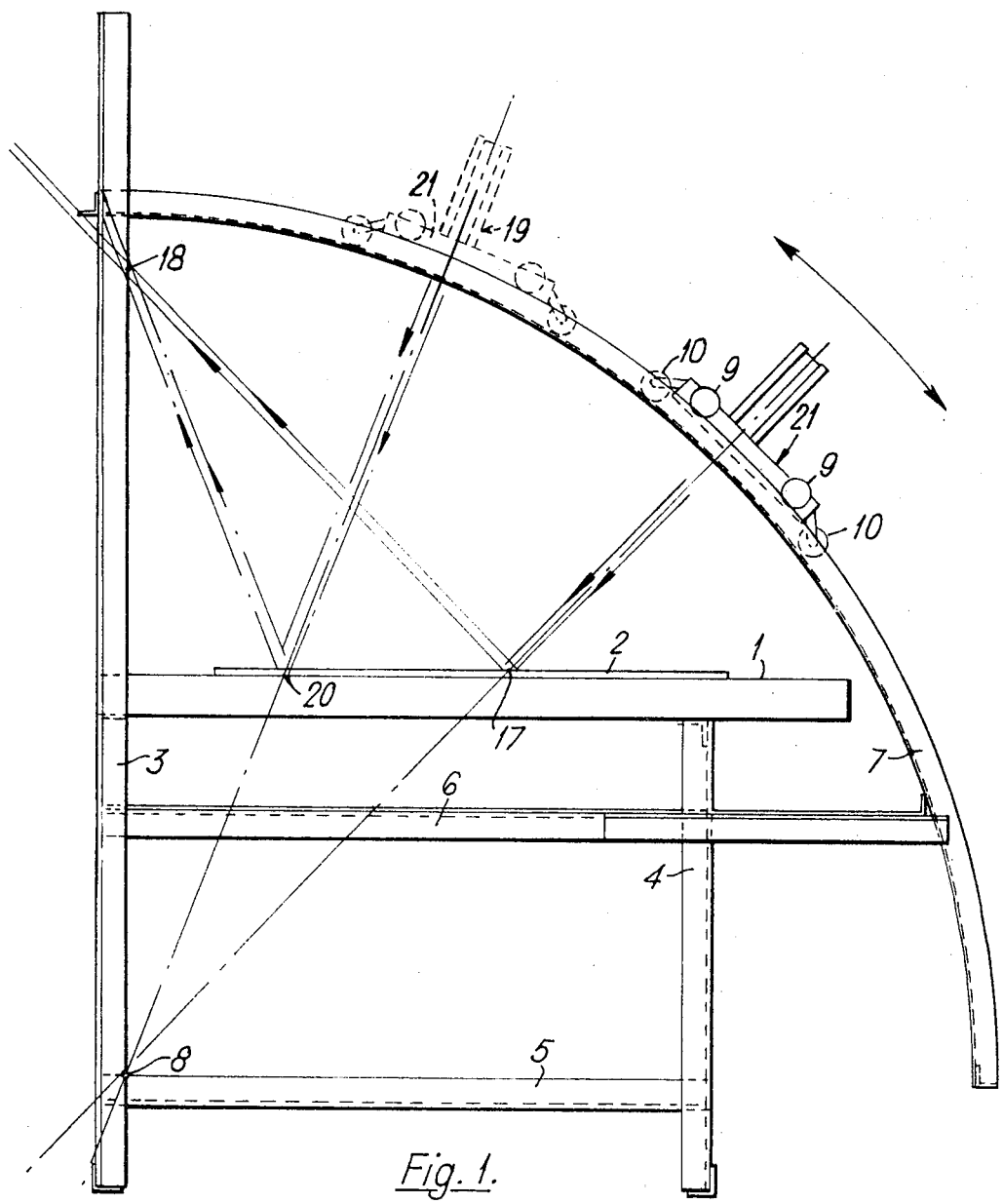
FIG. 1 is a side elevation, by way of example, of an apparatus for inspecting a glass surface.

Referring first to FIGS. 1 to 4, a horizontal opaque support 1, e.g. of wood, is provided for the glass sheet 2 whose top surface is to be inspected. The support 1 is carried by a framework comprising a pair of uprights 3 and a further shorter pair of uprights 4, suitably braced together by cross-pieces 5, 6 and others (not shown). The longer uprights 3 extend upwardly above the support 1.

A carriage 21 is provided for traversing the optical apparatus longitudinally over the glass sheet 2, and has wheels 9, 10 for locating the carriage on a pair of arcuate rails 7 secured at their upper ends to the uprights 3 and at their lower ends to the cross-pieces 6 and being spaced apart by a distance greater than the width of the glass sheet 2. In this example, the arcuate rails 7 are in the form of quadrants disposed about a centre 8 below the surface of the support 1 for the glass sheet 2.

Carried on the carriage 21 is a housing 11 for a lamp 12 and a lens system 13. The lamp 12 is, for example, a low wattage tubular lamp such as a 25 cm., 60 watt lamp, extending transversely of the glass sheet 2 and parallel thereto. The lens system 13 may be a single cylindrical lens or a plurality of smaller lenses arranged side by side and having a length greater than that of the tubular lamp 12. In this example, see FIG. 4, there are six bi-convex cylindrical lenses each 50 mm. x 45 mm. x 75 mm. focal length mounted side by side. The lens system 13 is mounted between the lamp 12 and an aperture 15 in the lower end 14 of the housing 11, through which aperture an incident beam is directed at the glass sheet 2 to illuminate a transversely extending area of its top surface.

The incident beam from the lamp 12 passing through the lens 13 and the aperture 15 strikes the top surface of the glass sheet 2 at 17 and is reflected through a position 18 vertically above the centre 8, which position 18 is the same distance above the glass sheet 2 as the centre 8 is below. On traverse of the carriage 21 carrying the optical apparatus, along the rails 7, the incident beam is moved about an axis passing through the centre 8 and extending parallel to the surface of the glass sheet 2 and perpendicular to the incident beam. The transverse area of the glass sheet which is illuminated by the beam of light is thus moved over the glass surface, and for any position of the carriage, for example the position shown in dash lines at 19, the incident beam will strike the glass sheet, for example at 20, and be reflected so that the main reflected beam continues to pass through the same position 18. Thus the illuminated area can be viewed by an observer stationed in one position, irrespective of the position of the carriage along the rails 7, whereby the whole of the top surface of the glass sheet 2 can be inspected whilst the observer remains stationary.

To ensure that the incident beam is constantly directed at the centre 8, the lamp housing 11 is tiltably mounted on the carriage 21 about the axis of a horizontal spindle 22 which lies parallel to the lamp 12 and the lens 13. In any position of tilt, the housing may be locked with respect to the carriage 21 by tightening the studs 23 carried by the housing 11 and passing through respective slots 16 in the carriage 21.

The carriage 21 can be moved, for example, by hand or by means of a cord (not shown) wound onto a drum by an electric motor.

In operation of the inspection apparatus, the greater intensity of reflected light from imperfections in the glass surface, for example sleeks, will be seen over a range of angles on each side of the main reflected beam. It has been found that a suitable viewing position for the operator, is one where the angle of observation of the illuminated area is up to about 10° from the angle of inclination of the main reflected beam with respect to the glass surface and that this position provides a good balance between falling off of intensity and uncomfortable proximity to the main beam. By means of the lens system described above, the main reflected beam occupies a relatively small viewing angle and is thus easier to avoid when viewing, for example, for a sleek.

Figure 5:
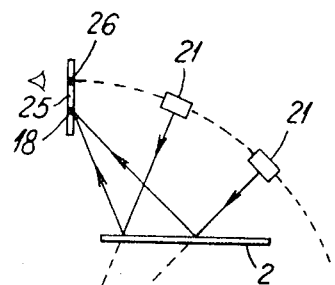
FIG. 5 is a diagrammatic representation of the apparatus including a screen having an aperture for visually observing the illuminated area.

With regard to FIG. 5, visual observation of the glass surface is improved by providing, at the stationary position 18, an opaque screen 25 having an aperture, e.g. a horizontal slit, at the preferred viewing position, in this example shown by the numeral 26. As explained above, the aperture is positioned at a different angle from the angle of inclination of the main reflected beam with respect to the surface of the glass sheet 2.

Figure 6:
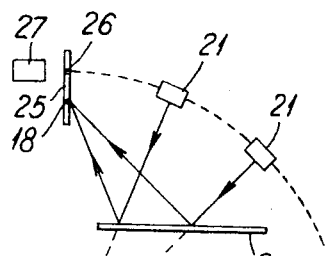
FIG. 6 is similar to FIG. 5 including a photomultiplier for receiving the light passing through the aperture in the screen.

Automatic observation of the glass sheet, i.e. measurement of the intensity of light at the illuminated area, can be attained (see FIG. 6) by providing once again at the stationary position 18, the opaque screen 25 having an aperture, e.g. a slit of width for example 0.005 inch, at position 26 and behind which is mounted a photomultiplier 27. Light adjacent to the main reflected beam, but not from the main beam, passes through the slit to the photomultiplier which continuously indicates the intensity of the reflected light passing through the slit as the carriage is traversed over the sheet 2. These means thus enable defects in the glass surface to be detected since the light reflected from any defect, for example from a sleek, within the illuminated area is of greater intensity than light reflected or scattered from adjacent areas of the glass surface.

As in the case of visual inspection, the aperture in the opaque screen is preferably disposed up to about 10° from the angle of inclination of the main reflected beam with respect to the glass surface.

Figure 7:
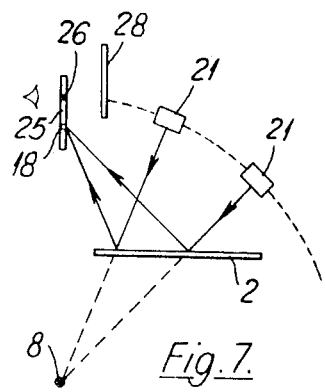
FIG. 7 is similar to FIG. 5 including a second screen disposed between the light source and the observation position.

There may be provided a further opaque screen 28 (see FIG. 7) disposed between the carriage 21 and the aperture at position 26 through which the intensity of light at the illuminated area is observed or measured. The screen 28 thereby cuts out any image of the lens 13 and the lamp housing front at said position 26, which may arise from stray light.

It will be appreciated that the invention is not limited to the specific details of the embodiment described above. For example, the cylindrical converging lens or lens system 13 may be replaced by a cylindrical concave mirror to concentrate the light beam therefrom.

We claim:

1. A method of inspecting a glass surface comprising directing a beam of light to illuminate an area of the glass surface and to produce by reflection a main reflected beam of light passing through a stationary position above the glass surface, traversing the incident beam about an axis which is disposed at the position below the glass surface of the imaginary mirror image of the said stationary position above the glass and extending parallel to the glass surface and perpendicular to the incident beam, whereby the illuminated area moves over the glass surface whilst the main reflected beam continues to pass through said stationary position, and observing said illuminated area from a position adjacent to said stationary position.

2. A method according to claim 1, wherein the step of observing comprises observing at an angle of observation of the illuminated area up to about 10° from the angle of inclination of the main reflected beam with respect to the glass surface.

3. A method according to claim 2, including directing the main reflected beam onto an opaque screen having an aperture at the position from which the illuminated area is to be observed, and detecting the intensity of light passing through the aperture.

4. Apparatus for inspecting a glass surface comprising a light source, a mounting frame means for mounting the sight source above the glass surface for directing an incident beam of light to illuminate an area of the glass surface and to produce by reflection a main reflected beam of light passing through a stationary position above the glass surface, and means for traversing the light source on said mounting frame means to rotate the incident beam about an axis which is disposed at the position below the glass surface of the imaginary mirror image of the said stationary position above the glass and extending parallel to the glass surface and perpendicular to the incident beam whereby the illuminated area moves over the glass surface whilst the main reflected beam continues to pass through said stationary position, so permitting the illuminated area to be observed from an observation position adjacent to said stationary position.

5. Apparatus according to claim 4, wherein the light source comprises an elongated lamp and a cylindrical converging lens to concentrate the light beam therefrom.

6. Apparatus according to claim 4, wherein the mounting frame means comprises a pair of rails that are arcuate about said axis, and said means for traversing comprises a carriage having wheels engaging said rails, means for propelling the carriage along said rails, and adjustable means mounting said light source on said carriage to maintain the orientation of the light source so that the incident beam is continually directed towards said axis.

7. Apparatus according to claim 4, including observation means comprising an opaque screen disposed at said stationary position and having a split aperture to allow light adjacent to the main reflected beam to pass therethrough to the observation position and to block light from the main reflected beam, the light reflected in the direction of the aperture from any defect on the glass surface within the illuminated area being of greater intensity than light reflected or scattered in the same direction from adjacent areas of the glass surface.

8. Apparatus according to claim 7, wherein the aperture is positioned up to about 10° from the angle of inclination of the main reflected beam with respect to the glass surface.

9. Apparatus according to claim 7, including a photomultiplier positioned to receive light passing through said aperture.

10. Apparatus according to claim 4, including an opaque screen positioned between the light source and the observation position adjacent the said stationary position.

References Cited

UNITED STATES PATENTS

| | | | |
|---|---|---|---|
| 1,949,619 | 3/1934 | Pfund | 356—212 X |
| 2,164,513 | 7/1939 | Gaebel | 356—209 |
| 2,215,211 | 9/1940 | Devol | 356—212 X |
| 2,328,456 | 8/1943 | Humphreys | 35—19 B |
| 2,406,166 | 8/1946 | Scott | 356—212 |
| 3,085,160 | 4/1963 | Dahms | 356—237 X |
| 3,245,306 | 4/1966 | Potter et al. | 356—209 UX |
| 3,340,624 | 9/1967 | Savin et al. | 35—34 |
| 3,349,665 | 10/1967 | Grosheim et al. | 356—209 X |
| 3,510,664 | 5/1970 | Nichols | 356—209 X |

RONALD L. WIBERT, Primary Examiner

W. A. SKLAR, Assistant Examiner

U.S. Cl. X.R.

35—19 B, 34; 356—120, 209, 212, 237

UNITED STATES PATENT OFFICE
CERTIFICATE OF CORRECTION

Patent No. 3,666,360   Dated May 30, 1972

Inventor(s) Harry Mills and Leslie Woods

It is certified that error appears in the above-identified patent and that said Letters Patent are hereby corrected as shown below:

The date of the British priority application should be Feb. 9, 1970

Signed and sealed this 19th day of September 1972.

(SEAL)
Attest:

EDWARD M. FLETCHER, JR.
Attesting Officer

ROBERT GOTTSCHALK
Commissioner of Patents